Patented Apr. 5, 1932

1,852,107

UNITED STATES PATENT OFFICE

LUDWIG J. CHRISTMANN, OF JERSEY CITY, AND GODFREY B. WALKER, OF ROSELLE, NEW JERSEY, ASSIGNORS TO AMERICAN CYANAMID COMPANY, OF NEW YORK, N. Y., A CORPORATION OF MAINE

METHOD OF FROTH FLOTATION

No Drawing. Application filed December 11, 1929. Serial No. 413,421.

This invention relates to a method of recovering minerals, such as sulphides from ores by subjecting the same to a flotation operation in the presence of a class of flotation promoting reagents.

It has been found that appreciable recoveries of values from copper, lead and zinc ores may be had when the same are subjected to flotation operations in the presence of the class of reagents of which 6. dimethylamino 2 mercapto benzothiazole is a type. It may be prepared according to the method given in J. f. pr. Ch. (2) 108 page 262 (1924).

The structural formula of this type of compound is as follows:

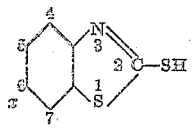

where $x$ is an organic group, for instance, an amino or a sbstituted amino group, such as dimethylamino or phenylamino. $x$ also includes alcohol groups, such as methoxy or ethoxy; and it may include halogens such as chlorine or bromide, but does not include $NO_2$ or $SO_3H$. The H may be replaced by an alkaline ion or radicle, such as sodium, ammonium, etc.

As illustrating the results which may be expected from copper ores, one showing the following analysis was chosen:

|  | Per cent |
|---|---|
| Total copper | 4.60 |
| Oxide copper | 0.02 |
| Iron | 20.2 |
| Arsenic | 0.34 |
| Insoluble | 69.40 |

The ore was stage crushed to minus ten mesh and then ground in a steel rod mill at one to one dilution with 4.0 lbs. of lime per ton of ore for a 22 minute period. The pH of the resulting pulp was 10.1. A flotation operation was carried out in a sub-aerated type of flotation machine at a density of 22% solids. The sodium salt of 6 dimethylamino 2 mercapto benzothiazole was used as a reagent in an amount equivalent to 0.0125 pounds per ton of ore, together with 0.06 pounds of pine oil per ton. One minute was allowed for agitation before air was admitted. A concentrate was floated for three minutes after which a middling was floated for seven minutes. The concentrate contained 94.9% of the copper and the middling 2.8% making a total copper recovery of 97.7%.

A somewhat similar operation was conducted with a zinc ore, using the same reagent. The ore showed the following analysis:

|  | Per cent |
|---|---|
| Zinc (sulphide) | 3.00 |
| Iron | 1.39 |
| Insoluble | 8.6 |
| Calcium oxide | 28.85 |
| MgO | 16.36 |

The ore was stage crushed to minus 20 mesh and then ground in a steel rod mill at one to one dilution for a five minute period. The resulting pulp showed a pH of 8.8. The pulp was transferred to a flotation machine of the mechanical type diluted to 22% solids and 0.1 lb. of the above reagent, together with 1.0 lb. of copper sulfate, and 0.12 lbs. of pine oil per ton of ore added. One minute was allowed for agitation and a concentrate floated for three minutes followed by a middling run for four minutes. The same quantity of pine oil as used for the concentrate was added to the middling float. As a result of this operation, the concentrate contained 52.5% of the zinc the middling 35.1% making a total zinc recovery of 87.6%.

A float was run on a lead ore which analyzed as follows:

|  | Per cent |
|---|---|
| Lead (sulphate) | 1.86 |
| Zinc | Trace |
| Iron | 4.96 |
| Insoluble | 6.70 |
| Calcium oxide | 26.94 |
| Magnesium oxide | 13.16 |

This ore was stage crushed to 20 mesh and then ground in a steel rod mill at a one to one dilution for a five minute period. The resulting pulp showed a pH of 8.0. After grinding the pulp was transferred to a flotation machine of the mechanical type and diluted to 22% solids. 0.05 lbs. of the above reagent and 0.06 lbs. of pine oil per ton of ore were added to the machine. One minute was allowed for agitation and then a concentrate was floated for a four minute period. The concentrate contained 96.5% of the lead.

While certain ores and reagents have been enumerated in the above description yet it is to be understood that we do not wish to be limited specifically thereto, as these substances have been mentioned as typical of a class and the invention is to be construed broadly and restricted only by the scope of the claims.

What we claim is:

1. A method of recovering minerals from ores which comprises subjecting said ores to a froth flotation operation in the presence of an amino mercapto benzothiazole as a promoter.

2. A method of recovering minerals from ores which comprises subjecting said ores to a froth flotation operation in the presence of a substituted amino mercapto benzothiazole as a promoter.

3. A method of recovering minerals from ores which comprises subjecting said ores to a froth flotation operation in the presence of a 6 organic substituted mercapto benzothiazole as a promoter.

4. A method of recovering minerals from ores which comprises subjecting said ores to a froth flotation operation in the presence of a 6 dimethylamino 2 mercapto benzothiazole as a promoter.

5. A method of recovering minerals from ores which comprises subjecting said ores to a froth flotation operation in the presence of a salt of an amino mercapto benzothiazole as a promoter.

6. A method of recovering minerals from ores which comprises subjecting said ores to a froth flotation operation in the presence of a salt of a substituted amino mercapto benzothiazole as a promoter.

7. A method of recovering minerals from ores which comprises subjecting said ores to a froth flotation operation in the presence of the sodium salt of 6 dimethylamino 2 mercapto benzothiazole as a promoter.

8. A method of recovering minerals from ores which comprises subjecting sulphide ores to a froth flotation operation in the presence of an amino mercapto benzothiazole as a promoter.

9. A method of recovering minerals from ores which comprises subjecting sulphide ores to a froth flotation operation in the presence of a substituted amino mercapto benzothiazole as a promoter.

10. A method of recovering minerals from ores which comprises subjecting sulphide ores to a froth flotation operation in the presence of a 6 dimethylamino 2 mercapto benzothiazole as a promoter.

11. A method of recovering minerals from ores which comprises subjecting said ores to a froth flotation operation in the presence of a promoter having the following structural formula

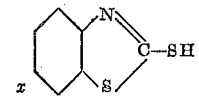

where $x$ indicates amino or substituted amino groups, and H may be replaced by an alkaline ion or group.

In testimony whereof, we have hereunto subscribed our names this 9th day of December, 1929.

LUDWIG J. CHRISTMANN.
GODFREY B. WALKER.